United States Patent Office 2,885,231
Patented May 5, 1959

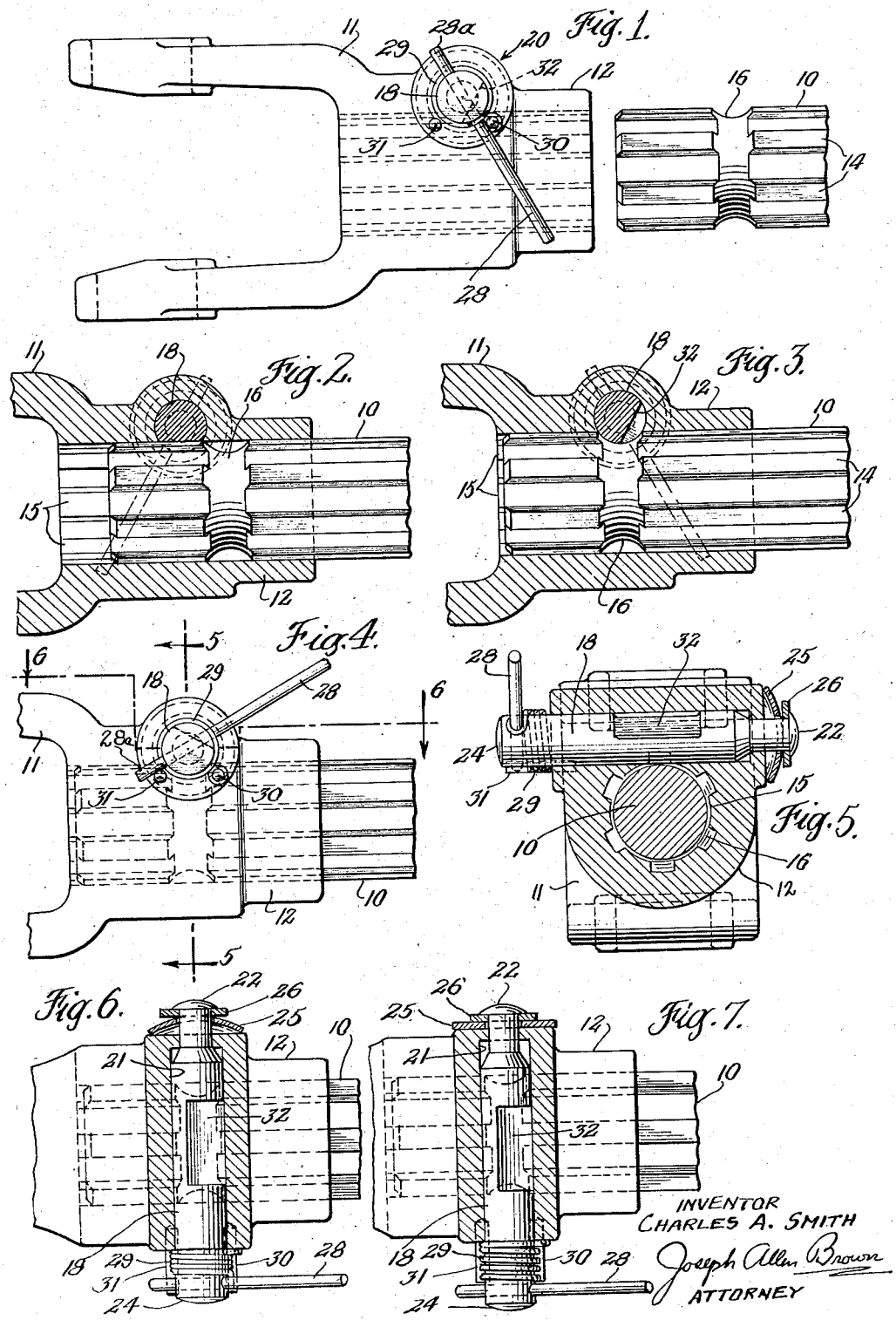

2,885,231

POWER-TAKE-OFF CONSTRUCTION

Charles A. Smith, New Holland, Pa., assignor to Sperry Rand Corporation, New Holland, Pa., a corporation of Delaware Application November 22, 1957, Serial No. 698,196

5 Claims. (Cl. 287—53)

The present invention relates generally to power-take-off assemblies, and more particularly to improved means for connecting an internally splined yoke of a universal joint to a splined propeller shaft.

A farm tractor is usually provided with a splined propeller shaft to which an implement may be connected for a source of power. Conventionally, such propeller shaft has an annular groove spaced inwardly from its outer end. The yoke of a universal joint at one end of a power-take-off assembly may be slid onto the shaft and latched thereto by means which fits into the shaft groove, such as the latch pin or plunger shown in Fig. 3 of U.S. Pat. No. 2,696,089 issued December 7, 1954. The plunger of the latch device shown in this patent assumes a normal at rest position wherein a detent portion thereof projects into the bore of the sleeve portion of the yoke. The plunger is longitudinally shiftable by manually depressing it to remove such detent portion from the bore. When released the plunger is urged back toward normal position by a compression spring. With this structure, the detent can be fitted into the groove of the propeller shaft or removed therefrom as desired. Such structure has the disadvantage that the operator must hold the plunger depressed when he slides the yoke onto the propeller shaft. This is sometimes difficult because the operator must align the splines of the respective members so that the yoke may be readily slid onto the shaft. Such aligning often requires rotatable manipulation of the shaft and/or yoke which is more difficult if the operator has to keep the latch plunger depressed while he does this manipulating.

One object of this invention is to provide latching means, in a power-take-off coupling of the character described, which does not have to be manually depressed when the yoke is slid onto the propeller shaft.

Another object of this invention is to provide a latching device which is automatically shifted to inoperative position when the yoke is slid onto the propeller shaft and is automatically actuated to lock the yoke on the shaft when the sleeve of the yoke is properly longitudinally positioned.

Another object of this invention is to provide a semi-automatic, positive locking device for holding the yoke latched to the propeller shaft so that end thrusts in either direction will not disconnect the parts.

A furher object of this invention is to accomplish the foregoing objects with a structure which is relatively simple and inexpensive.

Other objects of this invention will be apparent hereinafter from the specification and from the recital in the appended claims.

In the drawing:

Fig. 1 is a side elevation showing a propeller shaft and the yoke of a universal joint having a device constructed according to this invention for latching the yoke to the shaft. The latching device is shown in the position which it assumes prior to connection of the yoke with the propeller shaft;

Fig. 2 is a fragmentary part longitudinal section part side elevation showing the yoke partially pushed onto the propeller shaft and illustrating the position which the parts assume just before the yoke is latched to the shaft;

Fig. 3 is a view similar to Fig. 2 showing the yoke all the way on the shaft and the latching device in latched position;

Fig. 4 is a view similar to Fig. 3 but showing the latching device moved to locked position;

Fig. 5 is a section taken on the line 5—5 of Fig. 4, looking in the direction of the arrow;

Fig. 6 is a section taken on the lines 6—6 of Fig. 4 and looking in the direction of the arrows; and Fig. 7 is a fragmentary view similar to Fig. 6 but showing the latching device shifted longitudinally.

Referring now to the drawing by numerals of reference, 10 denotes a propeller shaft of a tractor and 11 a yoke of a power-take-off universal coupling, the yoke having a sleeve portion 12 adapted to be slid onto shaft 10. In order that shaft 10 may rotate yoke 11, when the yoke is fitted onto the shaft, the respective parts are appropriately splined, shaft 10 having splines 14 and the sleeve 12 of the yoke having splines 15.

In order that yoke 11 may be mounted on shaft 10, the parts must be relatively rotatably adjusted so that the splines on one member register with the grooves in the other member whereby the yoke may be moved longitudinally and readily slid onto the shaft. As will appear subsequently, with the latching device of this invention the operator's hands are left free to manipulate the yoke and shaft, no manual operation of the device being required when a coupling is being made.

Spaced inwardly from the outer end of shaft 10 is an annular groove 16. Such groove is adapted to receive a pin 18 of latching device 20 constructed according to this invention.

Pin 18 is disposed in a bore 21 (Fig. 6) in sleeve 12. The pin extends transversely relative to the longitudinal axis of the sleeve and is both rotatable and adjustable along its own axis. The rotational axis of the pin is such that the periphery of the pin is projectable into the bore of sleeve 12.

As shown in Figs. 5–7, pin 18 projects on opposite sides of sleeve 12, having one projecting end 22 and a second projecting end 24. Pin 18 is resiliently held as shown in Fig. 5 by a compression spring 25 interposed between the adjacent side of sleeve 12 and a fastener 26 on pin 18. The opposite end of pin 18 has an abutment member in the form of a handle 28 projecting diametrically through it, portions of the handle extending on opposite sides of the pin. Interposed between handle 28 and the adjacent side of sleeve 12 is a torsion spring 29 connected at one end to handle 28 and at its opposite end to a locator 30 projecting laterally from sleeve 12. Angularly spaced from locator 30, relative to the axis of the pin 18, is a stop 31 also projecting laterally from sleeve 12, the locator and stop being operable as hereinafter described.

Pin 18 has a cut-away between its two ends forming a cam face 32. The configuration of the pin and the positioning of this cut-away is such that in one rotatable position the cam face projects into the yoke sleeve bore (Figs. 1 and 3), in a second rotatable position (Fig. 2) no portion of the pin projects into the bore, and in third rotatable position (Fig. 4) another portion of the pin projects into the bore.

Operation

When the yoke 11 is not mounted on shaft 10, the pin 18 is disposed with the handle 28 in engagement with locator 30, being urged to such position by spring 29. Locator 30 limits the rotation of the pin in a counterclockwise direction (Fig. 1). It will be noted that in this position, which may be called position one, the cam face 32 projects into the bore of sleeve 12 and faces the end of the sleeve adapted to receive shaft 10. To mount the yoke onto the shaft, the operator aligns it with the shaft and moves it against the end of the shaft. Then he rotates one member on the other until the splines mesh, whereupon he slides the yoke longitudinally. When a spline on shaft 10 engages cam face 32, it cams or rotates the pin 18 to clockwise against the resistance of spring 29 to the position shown in Fig. 2. In such position, or position two, the pin is wholly outside of the bore of the sleeve 12 and slides along the top of the adjacent spline on the shaft.

When the yoke is moved longitudinally far enough, the pin 18 comes into register with the slot 16 in shaft 10. At this moment, the pin is rotated back to the position shown in Fig. 1 by spring 29. Thus, the yoke is automatically latched to the shaft.

Outward thrusts on the yoke will not pull it from the shaft 10. However, if the yoke is thrust inwardly it will cause the pin to rotate to the position shown in Fig. 2. If a quick outward thrust occurs at that moment, there is a possibility that the pin may "jump" the groove 16 before the spring 29 is able to rotate the pin back to latched position with handle 28 against locator 30. In this event, the yoke may become disconnected from the shaft. To prevent the possibility of such a disconnection, and to positively lock the yoke to the shaft, when the operator has the yoke in the position shown in Fig. 3 he grasps the handle 28 and manually shifts pin 18 axially against the resistance of the spring 25 (Fig. 7). The projection of the locator from the side of the sleeve 12 is such that after pin 18 has been moved axially, handle 28 may be moved past the locator 30. Once the handle is past the locator the operator lets it go and the spring 25 returns it to its normal position and the pin will be rotated by the spring 29 until the short end 28a of handle 28 engages stop 31 (Fig. 4). In this position, or position three, the yoke is positively locked on the shaft, such locking action being semi-automatic.

When pin 18 is disposed as shown in Fig. 4 thrusts of yoke 11 in either direction will not dislodge it from shaft 10.

To remove the yoke, the operator merely turns handle 28 clockwise from the position shown in Fig. 4 and at the same time pulls pin 18 axially against spring 25 so that the handle may pass over locator 30. Once past the locator, the operator allows pin 18 to shift axially to its normal position and continues to rotate the pin against the resistance of spring 29 until handle 28 engages stop 31 (Fig. 2). The yoke may now be slid off of the shaft.

While this invention has been described in connection with a particular embodiment thereof, it will be understood that it is capable of further modification, and this application is intended to cover any variations, uses, or adaptations of the invention following, in general, the principles of the invention and including such departures from the present disclosure as some within known as customary practice in the art to which the invention pertains, and as fall within the scope of the invention or the limits of the appended claims.

Having thus described my invention what I claim is:

1. A device for latching a sleeve against longitudinal movement on a shaft onto which the sleeve is slidable, wherein said shaft has an annular groove in its periphery, comprising a latch pin adapted to fit into said groove, means supporting said pin on said sleeve for rotatable movement about an axis transverse to the axis of the sleeve, said pin being so supported and the configuration of the pin being such that in one rotatable position the pin is projected into the bore of said sleeve and in a position other than said one position is disposed outside of said bore, means for positioning said pin in said other rotatable position when said sleeve is slid relative to said shaft, means for positioning said pin in a third rotatable position when said pin is in register with said annular groove, and means for positively locking said pin in said third position.

2. A device for latching an internally splined sleeve against longitudinal movement on a splined shaft onto which the sleeve is slidable, wherein said shaft has an annular groove in its periphery, comprising a pin adapted to fit into said groove, means supporting said pin on said sleeve for rotatable movement about an axis transverse to the axis of the sleeve, said pin having a cut-away portion forming a cam face on the pin, said pin being so supported that in one rotatable position said cam face extends into said bore, in a second rotatable position said cut-away faces said bore and the pin is disposed outside of said bore, and in a third position another portion of the pin extends into said bore, means rotatably biasing said pin in one direction, a fixed locator on said sleeve stopping the rotation of said pin in said one position, a spline on said shaft engaging said cam face when said sleeve is slid onto the shaft and rotating said pin against said biasing means to said second position, said pin returning to said first position upon register of said pin with said groove, and means whereby said pin may be moved past said locator to said third position and locked therein.

3. A device for latching an internally splined sleeve against longitudinal movement on a splined shaft onto which the sleeve is slidable, wherein said shaft has an annular groove in its periphery, comprising a pin adapted to fit into said groove, means mounting said pin on said sleeve for projection into the bore of said sleeve, said pin being rotatable and axially adjustable and having a cut-away portion forming on the pin a cam face, the axis of rotation of said pin being such that in one rotatable position said cam face extends into said bore, in a second rotatable position said cut-away is so disposed relative to said bore that the pin is wholly outside of said bore, and in a third position another portion of the pin extends in the bore, means resiliently holding said pin in a given axial position, means rotatably biasing said pin in one direction, an abutment on said pin, a fixed locator on said sleeve engageable by said abutment when said pin is in said given axial position, said locator stopping the rotation of said pin in said one direction when the pin is in said given axial position, a fixed stop member angularly spaced from said locator relative to the axis of said pin and engageable by said abutment when the pin is in said given axial position and rotated in a direction opposite to said one direction, said stop member being adapted to stop said pin in said second rotatable position, said pin being axially adjustable from said given axial position and against the resistance of said holding means whereby the pin may be rotated in said one direction past said locator to a third position and then returned to said given axial position.

4. A device as recited in claim 3 wherein said abutment comprises a handle extending diametrically through said pin and having portions extending on opposite sides of said pin, one extending portion of said handle being engageable with said locator and said stop when said pin is in said given axial position, the other extending portion of said handle being engageable with said stop when the handle is in said third position and in said given axial position.

5. A device for latching a sleeve against longitudinal movement on a shaft onto which the sleeve is slidable, wherein said shaft has an annular groove in its periphery, comprising a latch pin adapted to fit into said groove, means supporting said pin on said sleeve for rotatable movement about an axis transverse to the axis of the sleeve, said pin being so supported and the configuration of the pin being such that in one rotatable position the pin projects into the bore of said sleeve and in a position other than said one position is disposed outside of said bore, means biasing said pin to said one rotatable position, said pin coming into engagement with said shaft when said sleeve is slid onto the shaft and being rotated to said other position until the pin comes into register with said shaft annular groove whereupon the pin returns to said one rotatable position, means for positioning said pin in a third rotatable position with said pin in register with said annular groove, and means for positively locking said pin in said third position.

References Cited in the file of this patent

UNITED STATES PATENTS

| | | |
|---|---|---|
| 2,448,278 | Ronning | Aug. 31, 1948 |
| 2,639,160 | Studebaker et al. | May 19, 1953 |